May 16, 1967 F. H. HORNE 3,319,791
POPPET VALVE AND DISPOSABLE CONTAINER COMBINATION
Filed March 2, 1964 2 Sheets-Sheet 1
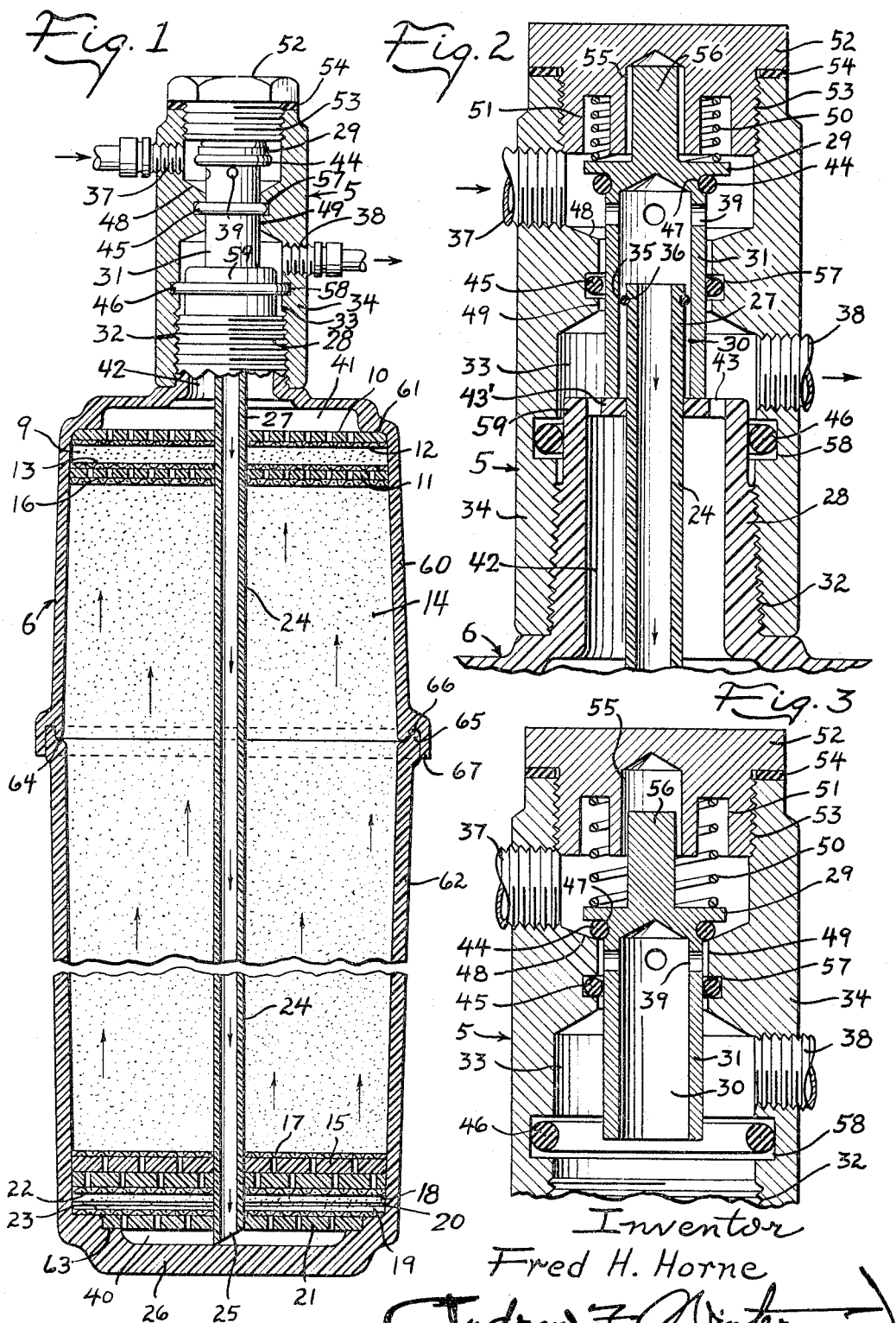
Inventor
Fred H. Horne
Andrew F. Wintercorn
Attorney

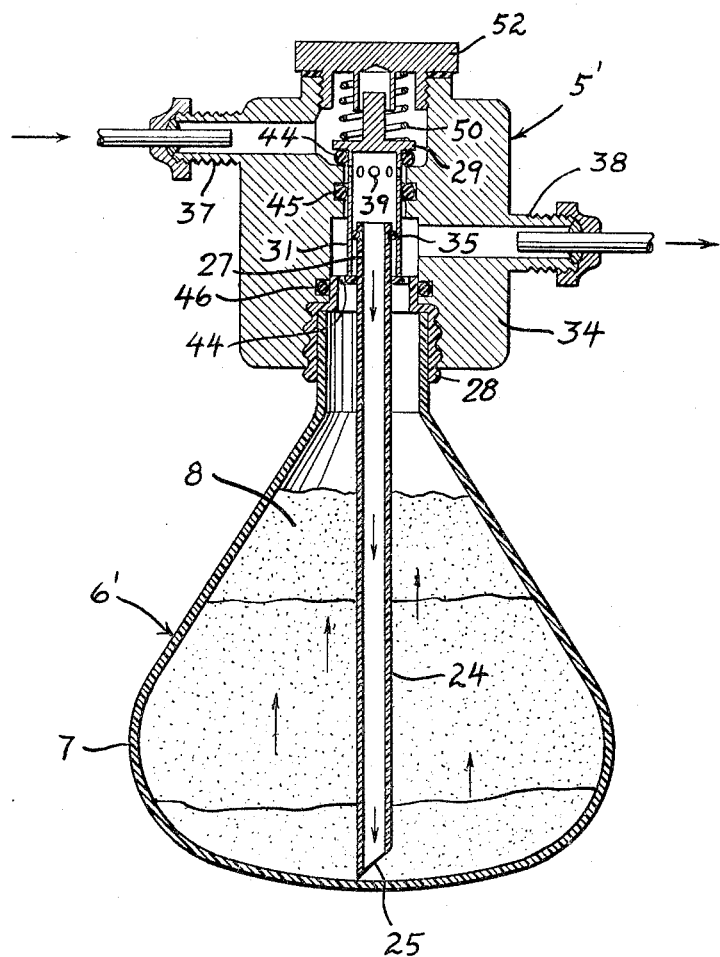

United States Patent Office

3,319,791
Patented May 16, 1967

3,319,791
POPPET VALVE AND DISPOSABLE CONTAINER COMBINATION
Fred H. Horne, 541 Prospect Ave.,
Lake Bluff, Ill. 60044
Filed Mar. 2, 1964, Ser. No. 348,684
18 Claims. (Cl. 210—234)

This invention relates to a new and improved poppet valve, individually and in combination with a disposable container useful in various fluid, both liquid and gas applications, as, for example in water and/or gas processing, filtering, water softening and/or conditioning, water deionization, etc. In certain applications, the re-' movable screw-in container is preferably of clear transparent plastic material so that the active material therein can be easily checked for change in color or shape, which in some applications is indicative of the need for replacement, and in other applications the screw-in container contains a multiplicity of different materials, one to remove taste and odor, another to remove anions and cations, another to remove silica, another to remove suspended solids, and so forth, to produce water that is odorless, tasteless, colorless, and deionized, all in one pass through the beds in the disposable screw-in container, the effluent water being substantially non-conductive.

The poppet valve has O-rings associated with the movable valve element for a good sealing action and there are other O-rings associated with the disposable screw-in container to provide good seals when the container is screwed into the body of the valve and unseats the valve element, and, in some applications, also regulates the flow by suitable adjustment of the valve with the container, the threaded connection in such applications affording as fine control of the fluid flow as desired.

The invention is illustrated in the accompanying drawings, in which:

FIG. 1 is a longitudinal section through a poppet valve and disposable screw-in container made in accordance with my invention;

FIG. 2 is an enlarged section of the upper portion of FIG. 1;

FIG. 3 is a corresponding section showing the valve closed by reason of removal of the disposable container, and FIG. 4 is a view similar to FIG. 1 but showing a disposable screw-in bulb of clear transparent plastic material containing a series of material, such as ion-exchange resin and filtering media, such as chars and other materials known to those skilled in the art, in fine granular form producing water suitable for humidifier applications, for example, to eliminate the encrustation and clogging otherwise experienced unless ion-free, solids free water is supplied to the humidifier, the resin indicating by a change in color, in this case, from blue to yellow, when it is time to remove the bulb and insert a new one.

Similar reference numerals are applied to corresponding parts throughout the views.

Referring first to FIGS. 1 to 3, the reference numeral 5 designates my improved poppet valve generally and the reference numeral 6 one form of my improved disposable container, another form being that indicated by the reference numeral 6' in FIG. 4, wherein the bulb 7 is of clear transparent plastic material and contains a bed 8 of ion exchange resin and filtering media in fine granular form that is one color at the outset but ultimately turns to another color when used up, thus indicating to the user when the service of same has been expended and it is time to remove the screw-in bulb and insert a new one. Transparency is not essential in the case of the two-piece plastic container 6 which contains a multiplicity of materials, to-wit, one kind of resin 9 between a pair of perforated retainer plates 10 and 11 and a pair of screens 12 and 13, another resin 14 in the main bed between the pair of perforated retainer plates 11 and 15 and a pair of screens 16 and 17, and two small beds 18 and 19 with charcoal 20 therebetween, the beds 18–20 being between the pair of perforated retainer plates 15 and 21 and a pair of screens 22 and 23. The effluent water in the case of the special bed 8 (FIG. 4) is ion-free and ideal for a humidifier application to avoid the encrustation and clogging otherwise experienced when ordinary untreated water is used. The effluent water from container 6 is odorless, tasteless, colorless and deionized and substantially non-conductive. Checking by means of a conductivity meter the amount of water passed through the container 6 or checking the effluent water for odor, taste, color and conductivity is enough to indicate when the container 6 should be replaced, without reference to any possible change in color of the bed materials.

In both of the containers 6 and 6' there is a central longitudinally extending tube or pipe 24 which is cut off at an angle at its lower end 25 to stay open when in abutment with the bottom 26 of the container and has its upper end 27 extending from the screw-threaded neck 28 on the top of the container to make a slip-connection with the poppet valve element 29 in the bore 30 of its tubular shank 31 before the valve is opened. Thus there is a discharge of water through tube 24 into the container when the valve 29 is unseated by further threading of neck 28 into the threaded end 32 of the bore 33 of valve body 34, the flow being regulatable, if desired, by screwing the neck 28 in more or less and accordingly opening the valve 29 more or less. A small O-ring 35 inserted in an annular groove 36 provided on the extension 27 or in bore 30 of the tubular shank 31 permits making a watertight slip-connection with the bore 30 in the hollow shank portion 31 of the poppet valve 29. In this interconnection of valve 5 and container 6, valve element 29 is unseated to place the inlet pipe connection 37 into communication with the outlet pipe connection 38 through the container 6, the incoming water (or other liquid or gas) being discharged through circumferentially spaced ports 39 into the bore 30 and thence through tube 24 into a chamber 40 in the bottom of the container 6 for flow upwardly through all of the material in the container and into another chamber 41 in the top of the container and thence out through the bore 42 of the neck 28 through a series of circumferentially spaced slots 43 in the end wall 43' of said neck and out through the outlet pipe connection 38.

In addition to the small O-ring 35 previously mentioned that is provided on the container on its extension 27 or in bore 30 of the tubular shank 31, there are three large O-rings 44, 45 and 46 all provided in the valve 5, the ring 44 being entered in an annular groove 47 in the upper end of shank 31 arranged to engage the beveled valve seat 48 in the body 34 at the upper end of the reduced bore 49 in the valve body when the container 6 is removed and the valve 29 is free to be closed under pressure of its coiled compression spring 50 and the pressure of the fluid on the back of the valve 29. The spring is housed in an annular groove 51 provided in a plug 52 that screws into the upper end of the valve body 34 as shown at 53. A gasket 54 seals the joint between the plug and body. A central bore 55 in the plug 52 serves as a guide for the reduced pilot end 56 provided on the upper end of the valve 29. The O-ring 45 is snapped into an annular groove 57 provided in the bore 49 and has a close sealing fit on the tubular shank 31 of the valve 29 to seal the bore against leakage along the outside of the shank 31 in either direction. The O-ring 46 is snapped into an annular groove 58 provided in the bore 33 of the body 34 just above the threads 32 and the threaded connection of the neck 28 of the container 6 with the valve body, and this O-ring has a tight sealing fit on the slightly reduced upper end portion 59 of the neck 28, as seen in FIG. 2, to prevent leakage along the neck 28 through the threaded connection at 32 regardless of how far in the neck 28 on the container 6 may be threaded into the body 34, it being contemplated to utilize the threaded connection at 32 as a means of controlling the flow rate past the valve 29 in certain installations where such flow control is necessary or desirable, the slightly reduced cylindrical portion 59 being elongated, as seen in FIGS. 1 and 2, sufficiently to accommodate an appreciable range of axial adjustment of the neck 28 between the fully opened position of valve 29 illustrated in FIG. 2 and the closed position illustrated in FIG. 3.

The two-piece container 6 has its upper half 60 formed in one piece with the neck 28, plastic plate 10 being assembled in this half in locating abutment with an annular shoulder 61 to define the bottom wall of the top chamber 41, and plastic plate 11 being cemented about its periphery to the inside of the half 60. The taper form of half 60 is incidental to the molding or forming operation and helps to locate the plate 11 by wedging engagement in the half 60. The other half 62 is also formed in one piece of the same plastic material—acrylonitrile— and has an annular shoulder 63 for locating abutment with plastic plate 21 to define the top wall of the bottom chamber 40. Plastic plate or plates 15 are cemented in place around their peripheries, like plate 11. Here again, the taper incidental to molding or forming is used to advantage in wedging engagement of the plate or plates 15. The leakproof joint 64 is cemented, a projecting bead 65 on the bottom half 62 being entered in an annular groove 66 in the upper half 60 to insure a tight connection. A rim 67 on the upper half has a close telescoping fit on the outside of the upper end of the lower half to further insure a good tight connection.

The operation should be clear from the foregoing description. In the absence of the container 6, the poppet valve 29 is held closed as seen in FIG. 3 under action of spring 50 and fluid pressure. When the container 6 is connected to the valve 5, the extension 27 first makes a fluid tight connection with the tubular shank portion 31 of the poppet valve 29 by entry in its bore 30, and then the valve 29 is unseated by engagement of the lower end of the tubular shank 31 with the top of the end wall 43' of neck 28, allowing flow of fluid from the inlet pipe connection 37 to the outlet pipe connection 38 through the container 6, the flow rate being controllable by threading the neck 28 in only as far as it is necessary to obtain the flow rate desired, full flow being obtained, of course, when the neck 28 is screwed in all the way home. In that way, as the valve 29 is opened gradually in the threading in of neck 28, water-hammer can be avoided entirely or reduced to a minimum. When the material in the container 6 is exhausted, or nearly so, as determined either by keeping track of the amount of liquid (or gas) treated from the time the container was installed, or by testing the effluent fluid from time to time when the approximate capacity of the container is reached, the container with the exhausted material is removed (and either discarded or its material is regenerated) and another container is installed immediately so that there is no interruption of service.

The operation with a transparent plastic bulb or other container like that shown at 6' in FIG. 4 is substantially the same.

Listed below is a number of uses for the combination of valve and container herein disclosed:

(1) Humidification — for residential—commercial—industrial;

(2) Air conditioning—for improving heat transfer by elimination of contaminants in the water of a closed circuit air conditioning system;

(3) Air compressors—for cooling water—eliminating moisture;

(4) Dental—for drills, sterilizers, molds, etc.;

(5) Medical—for sterilizers, etc.;

(6) Restaurant—for coffeemakers, dishwashers, etc.;

(7) Compressed air—for industrial plants to dry and filter air lines;

(8) Pneumatic controls—to protect delicate controls from moisture and foreign matter;

(9) Furnace humidifiers—in water line, upstream of humidifier;

(10) Taverns, cocktail lounges, etc.—for storage tanks, mixing drinks, eliminate delivery and handling of distilled water bottles;

(11) Hair shampoos—in beauty shops and at home;

(12) Portable humidifiers—in cabinet to which will be attached the feedwater hose;

(13) Plater—for rinse tank—as indicator valve to show acid contamination of Freon or chilled water circuit;

(14) Photography—to eliminate contaminants in the developing process, or for humidity control in dark rooms;

(15) Plastic mfg.—for platen coolers—eliminate shutdown of molding machines;

(16) Printing—for elimination of contaminants, etc.;

(17) Food manufacturers—to hot water vat for cooking food in cans, etc.;

(18) Gas stations—for applications similar to the standard final filter;

(19) Heating contractors—for humidity control of forced air systems, makeup water in hot water systems, and in radiant heat systems;

(20) All industries requiring needle valves, gate valves, expansion valves, proportioning valves, motorized valves, etc.;

(21) Aircraft—to eliminate contaminants in the water storage tanks of jet planes;

(22) Vending machines—for coffee, hot chocolate, carbonated drinks, etc.;

(23) Automotive—for oil pressure lines or as a substitute for oil filter;

(24) Water cooled bearings—to prevent bearing freeze-up;

(25) Turbine—for cooling water to nitrogen coolers;

(26) Circulating pumps—to eliminate contaminants in the water supplied to the pump seal, and

(27) Laundries — for commercial — industrial—residential washing machines.

It is believed the foregoing description conveys a good understanding of the objects and advantages of my invention. The appended claims have been drawn to cover all legitimate modifications and adaptations.

I claim:

1. In combination, a valve body having an inlet opening and an outlet opening, a valve element movable in said valve body to and from a closed position controlling flow through said body of a fluid from the inlet opening to the outlet opening, said valve element tending normally to move to closed position and when closed being held closed under fluid pressure from the inlet opening, a container for material through which the fluid must be passed before discharge from said outlet opening having a neck portion threadedly connectible in another opening provided in said valve body, the last mentioned opening being in transverse relationship to the outlet opening, the direction of threading of said container neck into said valve body being also the direction of unseating of said valve, said container having an inlet opening in the neck connectible with the valve body inlet opening when the valve element is moved to open position and having an outlet opening in the neck connectible with the valve body outlet opening, and means on the valve element arranged to engage the container neck between the inlet and outlet openings in the neck for (1) moving the valve element to open position operable in the threading of said container neck into the valve body from a retracted position, and (2) establishing the flow circuit through said container from the valve body inlet opening to the valve body outlet opening.

2. A structure as set forth in claim 1, including spring means tending normally to move said valve element to closed position.

3. A structure as set forth in claim 1 wherein the container is of elongated form to provide the needed capacity for material, the container neck being threadedly adjustable relative to the valve body to open the valve gradually.

4. A structure as set forth in claim 1 wherein said valve element is of a poppet type and engages a valve seat provided in the valve body, the means on the valve element arranged to engage the inner end of the container neck to open the valve in the connection of the container neck with the valve body comprising a tubular shank portion with a bore provided therein and having openings provided therein behind the valve end of the shank portion for communication with the inlet opening in the valve body when the valve is opened, and wherein said container has an inlet tube extending longitudinally thereof and the inlet opening in said neck is in the form of a tubular inlet projection on said container neck communicating with said tube which in connecting the container neck to the valve body makes a telescoping connection with said shank portion for fluid flow through the container.

5. A structure as set forth in claim 4 wherein the container is of elongated form and has distributor screen means in the opposite ends thereof between which the material in the container is disposed, the inlet tube extending longitudinally of the container through the distributor screen means in both ends thereof to deliver fluid behind the distributor screen means in the outer end of said container to insure distribution of fluid flow through said material before the fluid is discharged from the other end of said container, said tube having its outer end projecting from the container neck to form the tubular inlet projection having a telescoping connection with said valve shank.

6. A structure as set forth in claim 4 wherein said valve shank portion carries an O-ring arranged to seal the valve in closed position by abutment with the valve seat in said valve body.

7. A structure as set forth in claim 6 wherein said valve shank portion has an annular groove provided therein externally thereof in which the O-ring is seated.

8. A structure as set forth in claim 4 wherein said valve body has a longitudinal bore provided therein communicating with the inlet and outlet openings at its opposite ends, said tubular valve shank being reciprocable in said bore, said bore having an internal annular groove provided therein intermediate the ends thereof with an O-ring entered therein having sealing engagement on its outer periphery in said annular groove and on its inner periphery on said valve shank portion permitting reciprocation of said valve relative thereto.

9. A structure as set forth in claim 8 wherein said tubular projection on the neck of said container fits inside the tubular shank of the valve and carries an O-ring having a slip-seal fit in the bore in said valve shank portion.

10. A structure as set forth in claim 1 wherein said container contains a plurality of separated beds of different materials each for different reaction on the fluid passed therethrough.

11. A structure as set forth in claim 1 wherein the material in said container subjected to action by fluid flow therethrough changes its appearance when no longer useful, the container being of transparent material to enable visual checking of the condition of said material.

12. A structure as set forth in claim 1, wherein the container is detachably connected with said body in series with and between said inlet and outlet openings so that fluid flowing through said valve body must pass through material in said container, the container being replaceable by another container with a fresh amount of material when the first mentioned material becomes exhausted.

13. In combination, an elongated valve body having inlet and outlet openings provided therein in longitudinally spaced relation to one another with a longitudinal bore communicating with said openings at its opposite ends and an annular valve seat at the inlet end of said bore, a poppet type valve arranged to engage said seat and having a tubular shank portion reciprocable in said bore with openings provided therein behind the valve communicating with said inlet opening when the valve is open, spring means tending normally to close said valve, said valve body having an enlarged threaded bore provided therein at the outlet end of the longitudinal bore, a container for material through which the fluid going from the inlet opening to the outlet opening must be passed before discharge from said outlet opening, said container having a reduced neck portion threadedly received in the enlarged threaded bore, said neck portion biasing the valve open when threadedly received in said enlarged threaded bore, distributor screen means disposed inside said container at the opposite ends thereof between which the material in said container is received, and an inlet tube extending longitudinally of said container through said distributor screen means and extending through a hole provided in the neck to provide a tubular projection having a telescoping fit in the tubular shank portion of said valve, whereby fluid from the inlet opening when the valve is open is caused to flow behind the distributor screen means at the outer end of said container and be thereby distributed in its flow through the material in said container in flowing to the inner of said container, said neck having outlet openings provided therein annularly with respect to the tubular shank portion of said valve communicating with the outlet opening in said valve body, said container being adapted to be turned to thread the neck thereof inwardly in said valve body to open the valve gradually for regulated flow of fluid.

14. A structure as set forth in claim 13, wherein the distributor screen means in at least one end of said container contains a separate bed of a different material from that received between the distributor screen means at opposite ends of said container for a different reaction on the fluid passed therethrough.

15. A structure as set forth in claim 13, wherein said container is of sectional construction, being divided transversely of an intermediate portion of said container, whereby to enable assembling the distributor screen means in the opposite ends of said container remote from the open ends of the two sections, and also to permit filling of the two sections with material prior to the joining of the two sections together to form a unitary container.

16. A structure as set forth in claim 13, wherein the material in said container subjected to action by fluid flow therethrough changes its appearance as it becomes less useful in its reaction on the fluid passed therethrough, the container being of transparent material to enable visual checking of the condition of said material.

17. A structure as set forth in claim 13, wherein said valve body has an internal annular groove provided therein intermediate the ends of the longitudinal bore with an O-ring entered therein having sealing engagement on its outer periphery in said groove and on its inner periphery on the shank portion of said valve permitting reciprocation of said valve relative thereto, and wherein the shank portion has an annular groove provided therein externally thereof in which an O-ring is carried on the valve shank to seal the valve in closed position by abutment with the valve seat in said valve body.

18. A structure as set forth in claim 13, wherein the inlet tube has an annular groove provided therein in its end portion projecting from the neck of said container in which an O-ring is carried having a slip-seal fit inside the tubular shank portion of the valve.

References Cited by the Examiner

UNITED STATES PATENTS

| | | | |
|---|---|---|---|
| 2,265,267 | 12/1941 | Cowles | 251—149.6 |
| 2,758,719 | 8/1956 | Line | 210—288 |
| 2,777,716 | 1/1957 | Gray | 251—149.6 |
| 2,894,630 | 7/1959 | Humbert. | |
| 2,932,400 | 4/1960 | Scavuzzo | 210—235 |
| 3,040,894 | 6/1962 | Pall | 210—235 X |
| 3,129,919 | 4/1964 | Evans | 251—149.6 X |
| 3,169,112 | 2/1965 | Nelson | 210—266 |
| 3,230,964 | 1/1966 | Debrotnic et al. | 251—149.6 X |

FOREIGN PATENTS

| | | |
|---|---|---|
| 1,205,037 | 8/1959 | France. |
| 598,956 | 3/1948 | Great Britain. |

REUBEN FRIEDMAN, *Primary Examiner.*

C. DITLOW, *Assistant Examiner.*